Aug. 19, 1952     M. F. REIJNST     2,607,813
METHOD OF MAGNETIZING PARTLY DEMAGNETIZED PERMANENT
MAGNETS IN ALTERNATING CURRENT GENERATORS
Filed Nov. 22, 1949
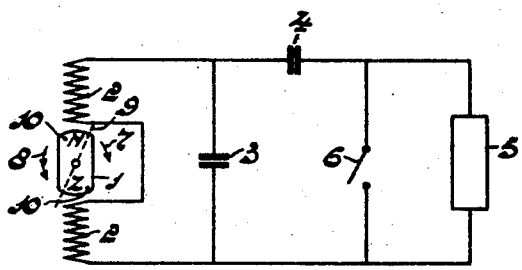
INVENTOR.
MAXIMILIEN FELIX REIJNST
BY
AGENT Patented Aug. 19, 1952

2,607,813

UNITED STATES PATENT OFFICE 2,607,813

METHOD OF MAGNETIZING PARTLY DE-MAGNETIZED PERMANENT MAGNETS IN ALTERNATING CURRENT GENERATORS

Maximilien Félix Reijnst, Eindhoven, Netherlands, assignor to Hartford National Bank and Trust Company, Hartford, Conn., as trustee Application November 22, 1949, Serial No. 128,884
In the Netherlands December 11, 1948

6 Claims. (Cl. 171—209)

This invention relates to methods of magnetising partly demagnetised permanent magnets in alternating current generators and also to devices for carrying out said methods.

German patent specification No. 663,954 disclosed a method of magnetising partly demagnetised permanent magnets in an alternating current generator while running, by means of a magnetising condenser which is connected at least across part of the generator winding. This method often yields satisfactory results, but experiments have revealed that a sufficient remagnetisation of the magnets cannot always be obtained.

The object of the invention is to provide an improved method. According to the invention a method of magnetising partly demagnetised permanent magnets in an alternating current generator while running by means of a magnetising condenser which is connected at least across part of the generator winding is characterized in that the magnets are magnetised in opposite phase while the generator is running. In the present case, the term "phase" is to be understood in relation to the direction of the field of the magnet and the direction of field of the winding at the instant the magnetising field is approximately a maximum. The reversal of phase may be obained either by removing the magnets and mounting them in reverse position, the generator again being driven in the normal direction of rotation, or by leaving the magnets unchanged and driving the generator in a direction opposite to the normal direction of rotation. With the use of the present invention magnetisation is possible where, with the use of the known method, magnetisation has proved insufficient.

The improved results according to the present invention may be ascribed to the phase change between the position of the permanent magnets at the instant the leading field set up by the condenser is produced or is a maximum in the pole winding and the position of the pole windings with a corresponding field. This method yields a more favourable position of the permanent magnets relatively to the pole windings at the instant the magnetising field is available, and consequently better results, the generator then being driven preferably at least at the full normal number of revolutions a minute.

It may be advisable to use, before or after this magnetisation, the method of magnetisation known from the aforesaid patent specification i. e. with the normal sense of rotation, preferably at least at the normal number of revolutions a minute.

The invention also relates to a device for magnetising partly demagnetised permanent magnets of an alternating current generator, at least part of the generator winding being connected by way of a switching member to a magnetising condenser, and the generator installation comprising means for reversing the direction of rotation of the generator.

In order that the invention may be better understood and readily carried into effect it will now be described more fully with reference to the accompanying drawing, given by way of example, in which a particularly suitable embodiment thereof is represented diagrammatically. A generator comprises a permanent magnetic rotor 1, having terminals N and Z, and two windings 2 connected in parallel with a condenser 3 and in parallel with the series-connection of a condenser 4 and a load 5. A short-circuiting switch 6 is connected in parallel with the load 5. During normal operation the switch 6 is open and the function of the two condensers 3 and 4 is to prevent and, in very unfavourable cases, to reduce detrimental demagnetisation of the permanent magnet 1 in the event of short-circuits of the load 5 involving such demagnetisation. If in the latter case undesired demagnetisation occurs, the normal direction of rotation of the rotor 1 (arrow 7) is reversed (double arrow 8). This may be effected in any known manner, for example by reversing the direction of rotation of the driving motor, by means of gears or by turning either the driving motor or the generator relative to the other and coupling them again. In the reversed direction of rotation, the switch 6 is subsequently closed for completely short-circuiting the load so that the two operating condensers 3 and 4 are connected in parallel with the windings 2 of the generator and remagnetisation of the rotor 1 may be effected.

It has been found that in case of remagnetisation in the normal direction of rotation (arrow 7) often only part of the permanent magnet is magnetised, for example in the direction of the broken line 9, which is related with the position of the magnet at the instant the magnetising field is substantially a maximum. In this event unmagnetised corners 10 remain, due to which complete remagnetisation is not feasible. When the direction of rotation is reversed (arrow 8) full remagnetisation takes place if the switch 6 is momentarily closed. Sometimes it is necessary to close the switch 6 momentarily at full speed both in the normal and in the opposite direction of rotation.

Instead of reversing the direction of rotation, it is also possible to reverse the position of the permanent magnetic rotor 1 (its left-hand end in the right-hand bearing and its right-hand end in the left-hand bearing) so that there also occurs magnetisation in opposite phase. With some generators this may sometimes be easier than reversal of the direction of rotation.

In this method also it may sometimes be necessary to effect a magnetisation either previously or subsequently with the magnet in its normal position.

What I claim is:

1. A method of magnetizing partially demagnetized permanent magnets of a dynamo having a given direction of the field with respect to the permanent magnets and with a capacitor connected in series with the dynamo and having a given value of capacitance at which detrimental demagnetization of the permanent magnets is substantially prevented while the dynamo is operating under a normal load connected in series with the dynamo, comprising reversing the polarity of the permanent magnets with respect to the direction of the field at the instant of maximum field intensity while continuing to operate the dynamo with the capacitor shunting the dynamo.

2. A method of magnetizing partially demagnetized permanent magnets of a dynamo having a given direction of the field with respect to the permanent magnets and with a capacitor connected in series with the dynamo and having a given value of capacitance at which detrimental demagnetization of the permanent magnets is substantially prevented while the dynamo is operating under a normal load connected in series with the dynamo and the capacitor, comprising reversing the direction of rotation of the armature of the dynamo with respect to the stator at the instant of maximum field intensity while continuing to operate the dynamo with the capacitor shunting the dynamo.

3. A method of magnetizing partially demagnetized permanent magnets of a dynamo having a given direction of the field with respect to the permanent magnets and with a capacitor connected in series with the dynamo and having a given value of capacitance at which detrimental demagnetization of the permanent magnets is substantially prevented while the dynamo is operating under a normal load connected in series with the dynamo, comprising reversing the direction of rotation of the armature of the dynamo with respect to the stator, short-circuiting the load and connecting the capacitor across the dynamo, and rotating the armature until remagnetization of the permanent magnets is effected.

4. A method of magnetizing partially demagnetized permanent magnets on the armature of a dynamo having a given direction of the field with respect to the permanent magnets and with a capacitor connected in series with the dynamo and having a given value of capacitance at which detrimental demagnetization of the permanent magnets is substantially prevented while the dynamo is operating under a normal load connected in series with the dynamo, comprising reversing the position of the armature to thereby reverse the polarity of the permanent magnets with respect to the direction of the field, short-circuiting the load and connecting the capacitor across the dynamo, and rotating the armature until remagnetization of the magnets is effected.

5. A device for magnetising partly demagnetised permanent magnets in an alternating current dynamo which comprises capacitative means shunting the dynamo, capacitative means in series with the dynamo and a load and having a given value of capacitance at which detrimental demagnetization of the dynamo is substantially prevented while the dynamo is operating under normal load conditions, means to short-circuit the load across the dynamo, and means to reverse the direction of the magnetic polarity of the permanent magnets with respect to the direction of the field in the dynamo.

6. A device for magnetising partly demagnetised permanent magnets in an alternating current dynamo which comprises capacitative means shunting the dynamo, capacitative means in series with the dynamo and a load and having a given value of capacitance at which detrimental demagnetization of the dynamo is substantially prevented while the dynamo is operating under normal load conditions, means to short-circuit the load across the dynamo, and means to reverse the direction of rotation of the armature of the dynamo in order to effect magnetisation of the demagnetised permanent magnets.

MAXIMILIEN FÉLIX REIJNST.

REFERENCES CITED

The following references are of record in the file of this patent:

UNITED STATES PATENTS

| Number | Name | Date |
| --- | --- | --- |
| 2,247,745 | Brader | July 1, 1941 |
| 2,326,696 | Stoddard | Aug. 10, 1943 |
| 2,486,656 | Klinkhammer | Nov. 1, 1949 |

FOREIGN PATENTS

| Number | Country | Date |
| --- | --- | --- |
| 456,373 | Great Britain | Nov. 9, 1936 |